United States Patent
Jeong et al.

(10) Patent No.: US 6,953,286 B2
(45) Date of Patent: Oct. 11, 2005

(54) FERRULE FOR HERMETICALLY PACKAGING OPTICAL FIBERS

(75) Inventors: Byung-Gil Jeong, Anyang-shi (KR); Oh-Dal Kwon, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/425,700

(22) Filed: Apr. 29, 2003

(65) Prior Publication Data

US 2004/0042734 A1 Mar. 4, 2004

(30) Foreign Application Priority Data

Aug. 29, 2002 (KR) .................................. 10-2002-0051361

(51) Int. Cl.⁷ .................................................. G02B 6/36
(52) U.S. Cl. ....................................................... 385/78
(58) Field of Search ........................... 385/53–55, 76–78; 439/206, 874, 936

(56) References Cited

U.S. PATENT DOCUMENTS

| 5,195,910 A | * | 3/1993 | Enomoto et al. | ........... 439/578 |
| 5,381,497 A | * | 1/1995 | Toland et al. | ................. 385/80 |
| 5,752,840 A | * | 5/1998 | Wu et al. | .................. 439/76.1 |
| 5,957,727 A | * | 9/1999 | Page, Jr. | ..................... 439/607 |

FOREIGN PATENT DOCUMENTS

| JP | 58-0028112 | 1/1983 | ............ G02B/7/26 |
| JP | 60-73506 | 4/1985 | ............ G02B/6/24 |
| JP | 4-16403 | 2/1992 | ............ G02B/6/42 |
| JP | 05-257031 | 10/1993 | ............ G02B/6/30 |
| JP | 10-268166 | 10/1998 | ............ G02B/6/42 |
| JP | 2000-171658 | 6/2000 | ............ G02B/6/255 |
| JP | 2001-305380 | 10/2001 | ............ G02B/6/30 |
| JP | 2001-525559 | 12/2001 | ............ G02B/6/36 |

* cited by examiner

*Primary Examiner*—Khiem Nguyen
(74) *Attorney, Agent, or Firm*—Cha & Reiter, L.L.C.

(57) ABSTRACT

Disclosed is a ferrule for hermetically packaging optical fibers which includes: an opening provided along a longitudinal direction of the ferrule and having an optical-fiber cable passing there-through; the optical-fiber cable including a plurality of optical-fiber strands; a pair of soldering holes, each extending from a predetermined place on the outer peripheral surface of the ferrule to the through hole; and a pinhole positioned between the soldering holes and extending from a predetermined place on the outer peripheral surface of the ferrule to the through hole.

18 Claims, 7 Drawing Sheets

FERRULE FOR HERMETICALLY PACKAGING OPTICAL FIBERS

CLAIM OF PRIORITY

This application claims priority to an application entitled "FERRULE FOR HERMETICALLY PACKAGING OPTICAL FIBERS," filed in the Korean Industrial Property Office on Aug. 29, 2002 and assigned Serial No. 2002-51361, the contents of which are hereby incorporated by reference.

BACKGROUND OF THE INVENTION

1. Field of the Invention

The present invention relates to an optical fiber and, more particularly, to a ferrule device for sealing a connector or other items fitted into the terminal end of the optical-fiber cable in order to hermetically package the optical fibers.

2. Description of the Related Art

In general, an optical fiber serves as an optical-signal-transmission medium used in an optical-communication system. By incorporating a wavelength-division-multiplexing technique in the optical-communication system, the optical system enables superhighway, high-capacity information to be transferred in long-distance communication, thus accelerating the flow of information in the optical-communication system.

A plurality of optical-fiber strands are bundled into a line of cables and used to establish a long-distance communication network. Here, at least two optical-fiber cables are connected to each other to provide the optical communication line. During operation, the optical line is subject to various environments, such as a hot-wet environment, an underwater environment, a toxic environment, or the like, which may have an adverse effect on the optical communication, in particular on a long-distance communication network. It is easy for the optical-fiber cables to be damaged through a tensile force or an external environment after the installation. As such, an inter-connector, such as a hermetic package or the like, between the optical-fiber cables is utilized to protect the fibers.

FIG. 1 shows a perspective view of a conventional hermetic packaging 100 used to couple optical fibers, and FIG. 2 depicts a sectional view of the hermetic packaging 100 shown in FIG. 1. As shown in FIGS. 1 and 2, the conventional hermetic packaging 100 for optical fibers comprises an optical-fiber block 110 serving as the terminal end of an optical-fiber cable, a case 120, and a ferrule 130 for the hermetic packaging.

The optical-fiber cable is shown as a ribbon-type optical-fiber cable 141 in which a plurality of optical-fiber strands are bundled to form a ribbon or band. In this ribbon-type optical-fiber cable 141, each of the optical-fiber strands is separated and aligned on the optical-fiber block 110 to be connected to the optical-fiber cable or another optical device at the other end.

The optical-fiber block 110 includes a lower block 113 provided with at least one V-shaped groove 115 for aligning each of the optical-fiber strands 142, and an upper-glass element 111 which is bonded on the lower block 113 by an adhesive, such as an epoxy or the like, together with the aligned optical-fiber strands 142 to protect the optical-fiber strands 142. This type of an optical-fiber block 110 is disclosed in detail in U.S. Pat. No. 6,118,917, filed on Sep. 12, 2000 and granted to the applicant, in which the optical-fiber block is manufactured by aligning each of the optical-fiber strands in the corresponding V-shaped grooves spaced apart in the same distance on a lower block, bonding an upper-glass element firmly and polishing the end surfaces of the optical-fiber strands to minimize a transfer loss.

The case 120 serves to prevent any foreign materials from penetrating the interior of the ribbon-type optical-fiber cable 141 when the outer sheath of the terminal end of the ribbon-type optical-fiber cable is removed to expose each of its strands 142. The case 120 also acts to protect the optical-fiber block 110 at the same time. Due to handling problems, the optical-fiber cable 141 is preferably connected with the optical-fiber block 110 first and then bonded with the case 120. Thus, the bonded portion of the case 120 must be provided with a passageway of sufficient size that the optical-fiber block 110 can pass through it.

If the passageway of the case 120 is too large, the 120 is not only unsuitable to bond directly with the ribbon-type optical-fiber cable 141 and is also prone to damage the optical-fiber cable in the portion to be bonded. For this reason, a ferrule 130 for the hermetic packaging comes to use, as explained with reference to FIGS. 3a to 5b.

FIG. 3a is a perspective view of a ferrule 30 for hermetically packaging optical fibers according to one conventional embodiment. FIG. 3b is a sectional view of the ferrule 30 shown in FIG. 3a. As shown in FIGS. 3a and 3b, the ferrule 30 is provided with a hole 31, which extends in a longitudinal direction and through which a ribbon-type optical-fiber cable passes, and a soldering hole 31, which extends from the outer peripheral surface of the ferrule to the through hole 31. With the ferrule 30, the optical-fiber cable passes through the through hole 31, then the soldering hole 33 is injected with molten solder. Thereafter, the optical-fiber block is connected to the end of the optical-fiber cable and then the case is bonded with the ferrule 30, thereby completing the hermetic-packaging process.

However, the conventional ferrule has a drawback in that while the solder material is injected into the soldering hole, some foreign materials or gases are not perfectly removed from the hole so that air bubbles remain in the hole after the soldering process which leads to an incomplete seal.

FIG. 4 is a perspective view of a ferrule 40 for hermetically packaging optical fibers according to another conventional embodiment. As shown in FIG. 4, this ferrule 40 includes an upper body 43 and a lower body 41. First, a ribbon-type optical-fiber cable is arranged in a recess 45 of the lower body 41 and an adhesive is applied, then finally the upper body 43 is mated with the lower body 41. With this ferrule 40, there is an advantage in that it is easy to manufacture. However, there are disadvantages in that air bubbles still remain after the mating between the two bodies as it is impossible to achieve precise mating through the mating process between the upper body 43 and the lower body 41 due to a machining allowance of the components.

FIG. 5a is a perspective view of a ferrule 50 for hermetically packaging optical fibers according to yet another conventional embodiment, and FIG. 5b is a sectional view of the ferrule 50 shown in FIG. 5a. As shown in FIGS. 5a and 5b, the ferrule 50 is provided with a hole 51, which extends in a longitudinal direction and through which a ribbon-type optical-fiber cable passes, and two soldering holes 53 and 55 each extending from the outer peripheral surface of the ferrule to the hole 51. In this ferrule 50, the ribbon-type optical-fiber cable passes through the through hole 31 and then the soldering hole 33 is injected with molten solder. The optical-fiber block is connected to the end of the optical-fiber cable, then the case is bonded with the ferrule 50, thus completing the hermetic-packaging process. Here, any one of the soldering holes 53 and 55 is filled with molten solder, and the other acts to expel foreign materials or gases from the through hole. Therefore, this embodiment can attain a seal better than the prior embodiments. However, this ferrule 50 still has a drawback in that while the solder is injected into the soldering hole, foreign materials and gases are not completely removed from the through hole, so that the resulting hermetic packaging cannot satisfy the desired sealing quality.

SUMMARY OF THE INVENTION

Accordingly, the present invention has been made to solve the above-mentioned problems occurring in the prior art and provides further advantages, by providing a ferrule for hermetically packaging optical fibers, from the interior of which it is easy to expel foreign materials, gases, or the like during the solder-injection process to attain an optimal hermetic packaging for optical fibers.

According to one aspect of the invention, there is provided a ferrule for hermetically packaging optical fibers comprising: a through hole provided along a longitudinal direction of the ferrule and having an optical-fiber cable passing through it; a pair of soldering holes, each extending from a given place on the outer peripheral surface of the ferrule to the through hole; and, a pinhole positioned between the soldering holes and extending from a predetermined place on the outer peripheral surface of the ferrule to the through hole.

BRIEF DESCRIPTION OF THE DRAWINGS

The above features and advantages of the present invention will be more apparent from the following detailed description taken in conjunction with the accompanying drawings, in which:

FIG. 3b is a sectional view of the ferrule shown in FIG. 3a;

FIG. 5b is a sectional view of the ferrule shown in FIG. 5a;

FIG. 6b is a sectional view of the ferrule shown in FIG. 6a;

FIG. 7 is a sectional view of a hermetic packaging for optical fibers using the ferrule shown in FIG. 6a.

DETAILED DESCRIPTION OF THE PREFERRED EMBODIMENT

Hereinafter, preferred embodiments of the present invention will be described in detail with reference to the accompanying drawings. For the purposes of clarity and simplicity, a detailed description of known functions and configurations incorporated herein will be omitted as it may make the subject matter of the present invention unclear.

Figure 1:
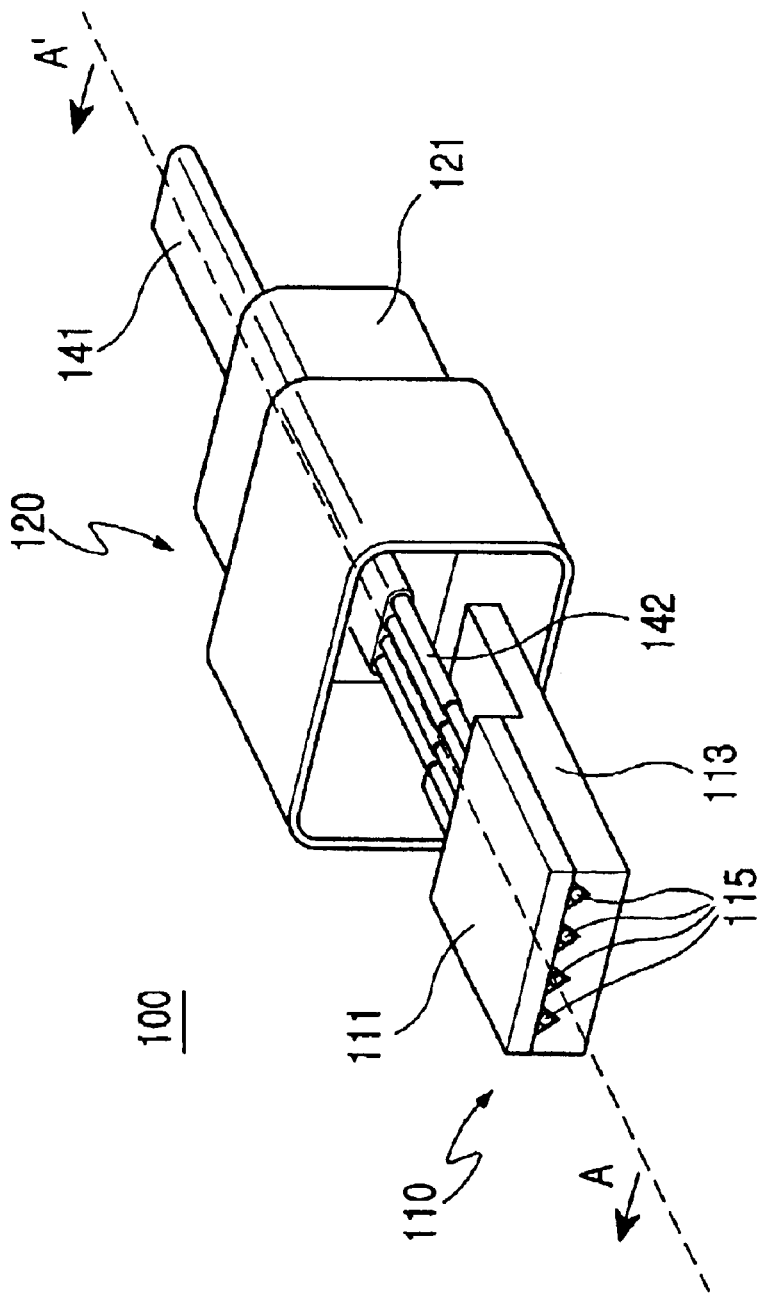
FIG. 1 is a perspective view of a conventional hermetic packaging for optical fibers.
Figure 2:
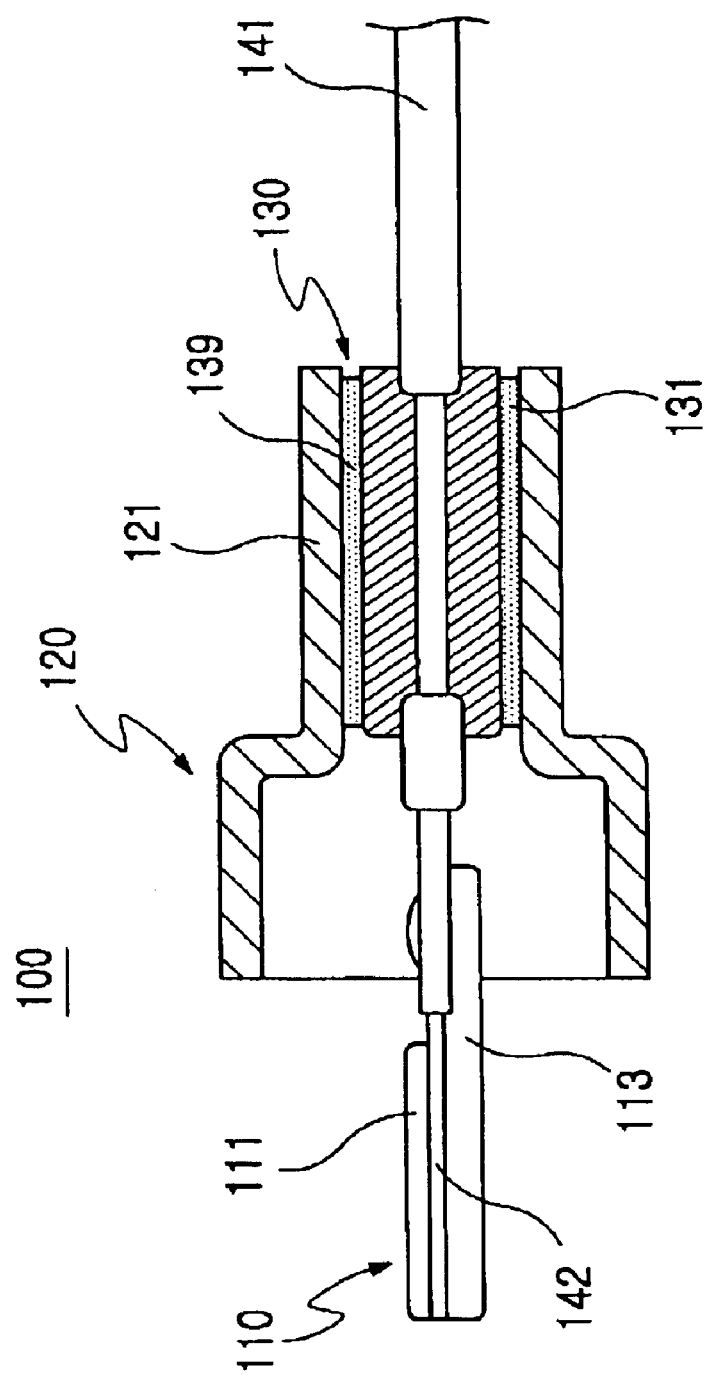
FIG. 2 is a sectional view of the hermetic packaging shown in FIG. 1.
Figure 3A:
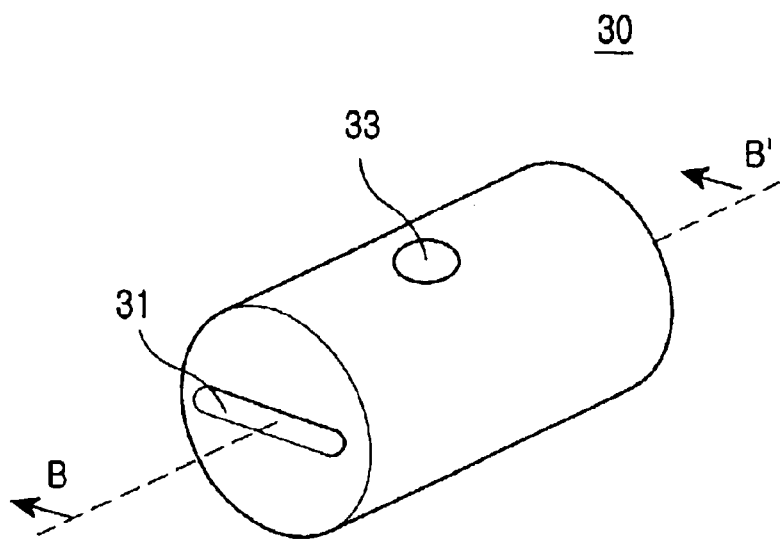
FIG. 3a is a perspective view of a ferrule for hermetically packaging optical fibers according to one conventional embodiment.
Figure 3B:
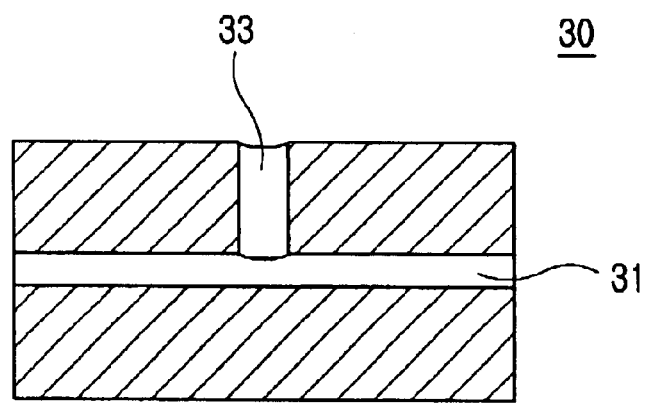
Figure 4:
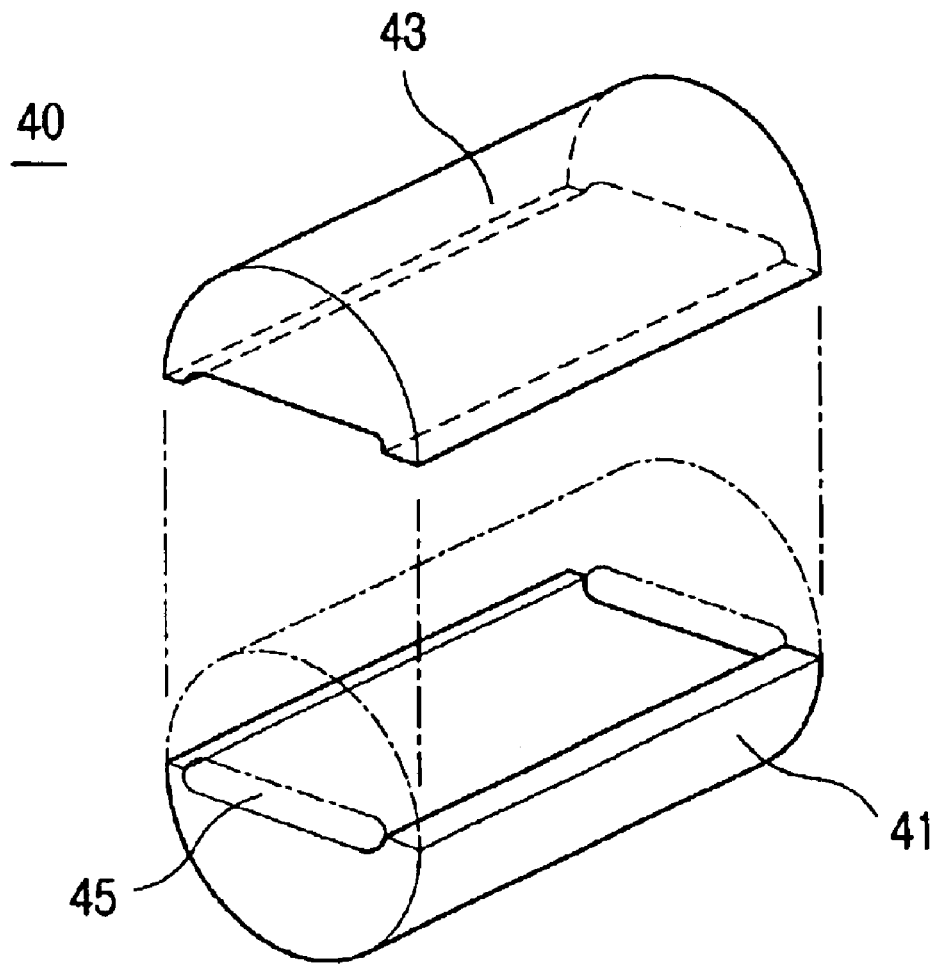
FIG. 4 is an exploded perspective view of a ferrule for hermetically packaging optical fibers according to another conventional embodiment.
Figure 5A:
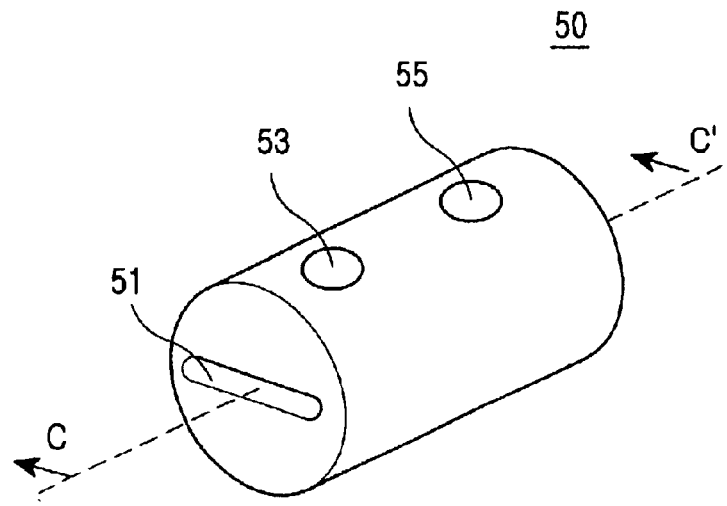
FIG. 5a is a perspective view of a ferrule for hermetically packaging optical fibers according to yet another conventional embodiment.
Figure 5B:
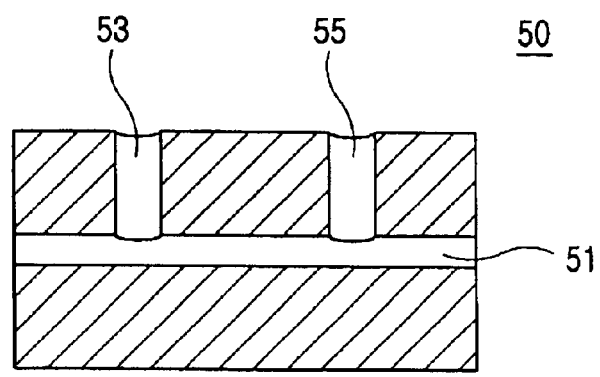
Figure 6A:
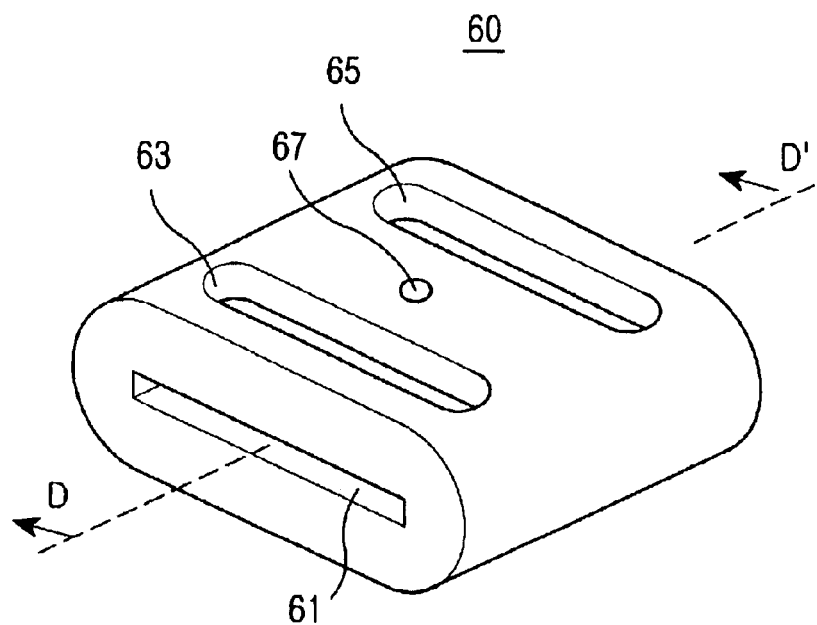
FIG. 6a is a perspective view of a ferrule for hermetically packaging optical fibers according to a preferred embodiment of the present invention.
Figure 6B:
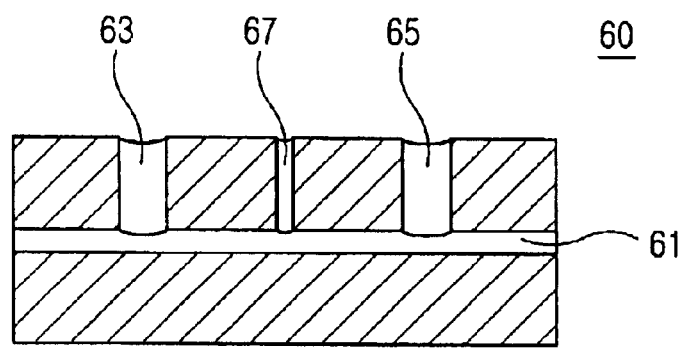

FIG. 6a is a perspective view of a ferrule 60 for hermetically packaging optical fibers according to the preferred embodiment of the present invention. FIG. 6b is a sectional view of the ferrule 60 shown in FIG. 6a. As shown in FIGS. 6a and 6b, the ferrule 60 includes: a hole 61, which extends in a longitudinal direction and through which a ribbon-type optical-fiber cable passes; a pair of soldering holes 63 and 65 each of which extends from the outer peripheral surface of the ferrule to the hole 61; and, a pinhole 67 disposed between the pair of soldering holes 63 and 65 and extending from the outer peripheral surface between the soldering holes 63 and 65 to the hole 61. The pinhole 67 is preferably positioned in the middle section between the pair of soldering holes 63 and 65. The soldering holes 63 and 65, and the pinhole 67 are each formed in a vertical direction relative to the longitudinal axis of the ferrule 60—that is to say, relative to the through hole 61. Further, in the inventive ferrule 60, the greater the number of optical fiber strands of the ribbon-type optical-fiber cable received in the through hole 61 becomes, the longer the soldering holes 63 and 65 become in a horizontal direction of the ferrule 60.

Now, a description below will be made of a hermetic packaging 700 for optical fibers using the aforementioned ferrule 60 with reference to FIG. 7.

Figure 7:
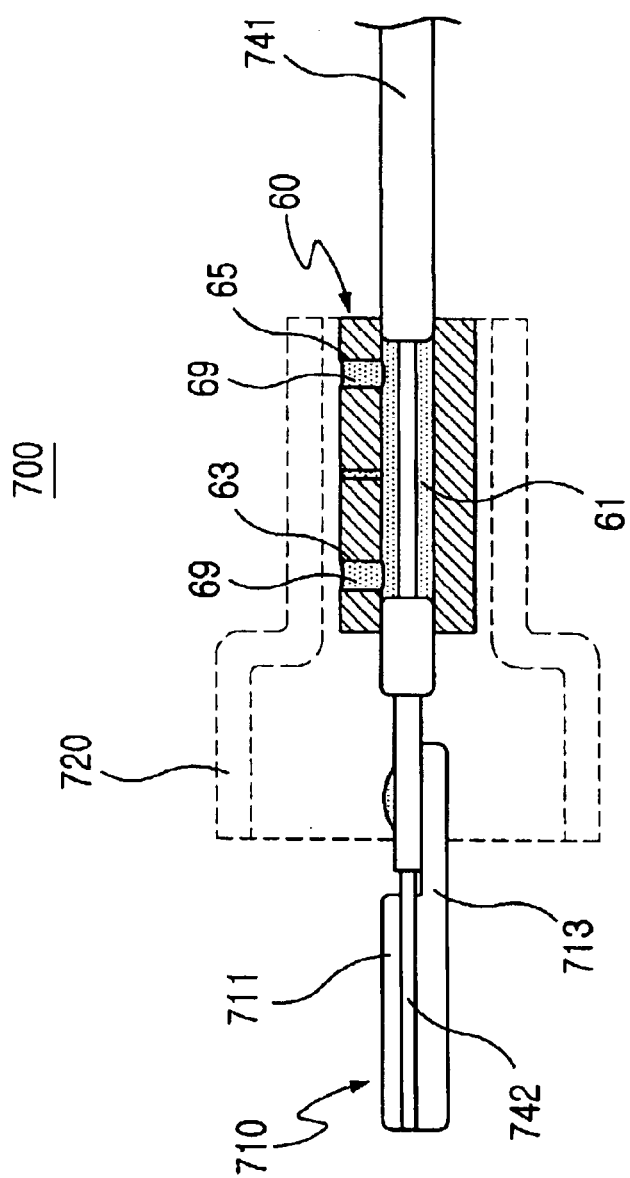

FIG. 7 illustrates a sectional view of a hermetic packaging 700 for optical fibers using the ferrule 60 shown in FIG. 6a. First, for the connection of an optical-fiber block 710, the ribbon-type optical-fiber cable 741 has its outer sheath removed over a predetermined length to separate into a plurality of optical-fiber strands 742, and each optical-fiber strand 742 also has its outer sheath removed over an appropriate length so that they are made to align along at least one V-shaped groove of the optical-fiber block 710.

Then, the ferrule 60 is positioned for packaging hermetically the ribbon-type optical-fiber cable 741, then any one of the soldering holes 63 and 65 is filled with molten solder. When the optical-fiber strands positioned in the hole 61 of the ferrule 60, the outer sheathes which enclose each of the optical-fiber strands are all removed, then the exposed cladding surfaces of the optical-fiber strands are preferably coated with metal. This helps facilitate a fusing between the solder and optical-fiber strands.

While any one of the soldering holes 63 and 65 is injected with the solder, the other allows any foreign materials, gases, or the like to be removed from the hole 61. In addition, the pinhole 67 allows gases to escape further from the hole 61. Thus, while the hole 61 is injected with molten solder, gases are easily discharged from the interior of the through hole as the interior of the through hole is filled with the solder.

After the ferrule 60 is bonded firmly, each of optical fiber strands 742 is aligned on the optical-fiber block 710, then the packaging case 720 is coupled firmly to the ferrule 60, thereby completing the hermetic packaging.

As seen from the foregoing, the ferrule for hermetically packaging optical fibers according to the preferred embodiments of the present invention includes two holes for injecting the solder and at least one pinhole positioned between them. As such, foreign materials, gases, or the like are easily removed from the ferrule while the solder is injected into the ferrule. As a result, the sealing quality between the optical fiber cables is improved and sealing failure is reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for hermetically packaging optical fibers comprising;
   a ferrule member having a first upper member and a lower member, the ferrule member having a hole provided along a longitudinal direction of the ferrule member for receiving an optical-fiber cable;
   a pair of soldering holes, each extending from an outer surface of the ferrule member to the through hole at a predetermined angle; and,
   at least one pinhole positioned between the soldering holes and extending from the outer surface of the ferrule member to the hole.

2. The ferrule according to claim 1, wherein the pinhole is positioned in a mid-point between the soldering holes.

3. The ferrule according to claim 1, wherein one of the soldering holes provides a passageway for a solder material to be injected thereto, so that gas in the hole is removed through the other of the soldering holes.

4. The ferrule according to claim 1, wherein the optical-fiber cable comprises a plurality of optical-fiber strands.

5. The ferrule according to claim 4, wherein the outer sheath of the optical-fiber strands disposed is removed and coated with a metal material.

6. The ferrule according to claim 1, wherein each of the soldering holes has a shape of an elongated hole extending in a direction perpendicular to a longitudinal axis of the ferrule.

7. The ferrule according to claim 1, wherein the soldering holes are symmetrically positioned with respect to a central section of the ferrule.

8. The ferrule according to claim 1, wherein the soldering holes extend in a direction perpendicular to a direction in which the hole extends.

9. The ferrule according to claim 1, wherein the pinhole extends in a direction perpendicular to the longitudinal direction of the ferrule.

10. An apparatus for hermetically packaging optical fibers comprising;
    a ferrule member having a first upper member and a lower member, the ferrule member having a hole provided along a longitudinal direction of the ferrule member for receiving an optical-fiber cable;
    a pair of soldering holes, each extending from an outer surface of the ferrule member to the through hole at a predetermined angle;
    at least one pinhole positioned between the soldering holes and extending from the outer surface of the ferrule member to the hole;
    a packaging case is coupled to the ferrule for completing the hermetic packaging; and
    wherein the pair of soldering holes are formed as pair of long opening extended in a horizontal direction of the ferrule and parallel with the hole for receiving the optical fiber cable.

11. The ferrule according to claim 10, wherein the pinhole is positioned in a mid-point between the soldering holes.

12. The ferrule according to claim 10, wherein one of the soldering holes provides a passageway for a solder material to be injected thereto, so that gas in the hole is removed through the other of the soldering holes.

13. The ferrule according to claim 10, wherein the optical-fiber cable comprises a plurality of optical-fiber strands.

14. The ferrule according to claim 13, wherein the outer sheath of the optical-fiber strands disposed is removed and coated with a metal material.

15. The ferrule according to claim 10, wherein each of the soldering holes has a shape of an elongated hole extending in a direction perpendicular to a longitudinal axis of the ferrule.

16. The ferrule according to claim 10, wherein the soldering holes are symmetrically positioned with respect to a central section of the ferrule.

17. The ferrule according to claim 10, wherein the soldering holes extend in a direction perpendicular to a direction in which the hole extends.

18. The ferrule according to claim 10, wherein the pinhole extends in a direction perpendicular to the longitudinal direction of the ferrule.

* * * * *